United States Patent Office 3,313,720
Patented Apr. 11, 1967

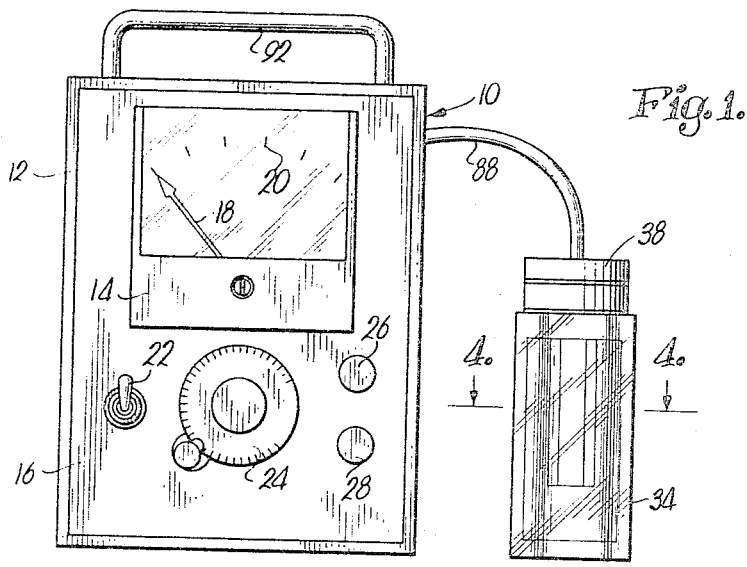
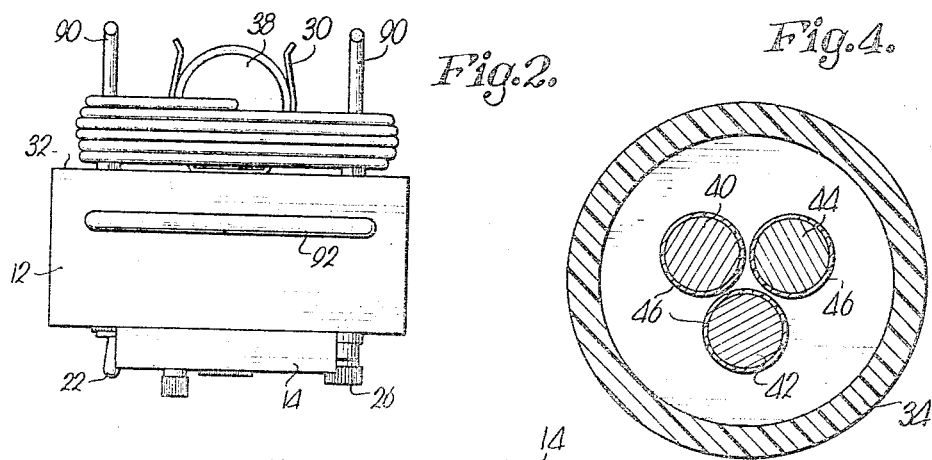
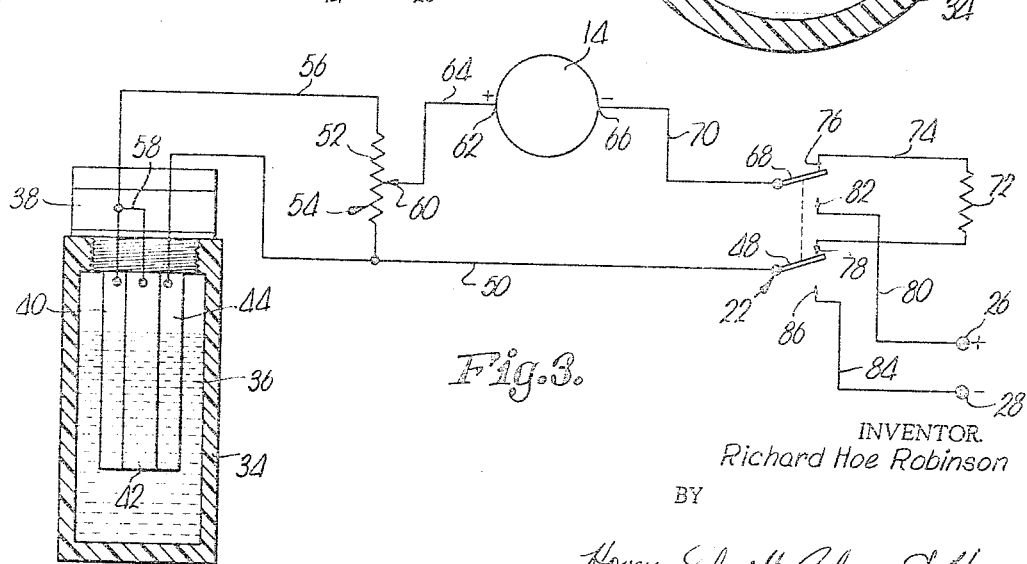

3,313,720
APPARATUS FOR MEASURING DISSOLVED OXYGEN IN WATER
Richard Hoe Robinson, Kansas City, Mo., assignor to Labconco Corporation, a corporation of Missouri
Filed Apr. 19, 1963, Ser. No. 274,219
9 Claims. (Cl. 204—195)

This invention relates to apparatus for determining the dissolved oxygen content of a liquid and particularly to a direct reading instrument capable of indicating the amount of dissolved oxygen in the liquid by the simple expedient of the operator immersing a probe in the liquid and visually observing the reading on a dissolved oxygen indicator.

The amount of dissolved oxygen in a liquid such as water, has heretofore been a relatively difficult analytical operation because of the small amount of oxygen which is actually present in the water and the complicated tests which must be performed in order to accurately determine the presence and amount of the oxygen which is dissolved in the liquid. In most instances, the amount of dissolved oxygen in the liquid will not exceed about ten parts per million and, therefore, requiring very sensitive instruments operated by relatively skilled technicians. Furthermore, it has not heretofore been possible to maintain an accurate surveillance on the amount of dissolved oxygen in a body of water and permitting utilization of the analytical instrument as a device for varying the amount of air or oxygen which is supplied to the water to maintain the dissolved oxygen at a predetermined level.

It is, therefore, the primary object of the present invention to provide apparatus for measuring dissolved oxygen in a liquid such as water, which requires no laboratory procedures, provides an immediate visual indication of the amount of oxygen in a body of liquid, and which is completely portable for use at any desired location without outside current sources or accessory instruments.

It is another important object of the invention to provide apparatus for measuring dissolved oxygen in water employing probe structure which may be immersed in the liquid and having measuring means operably connected thereto for giving a visual indication of the amount of oxygen in the liquid, whereby all chemical tests and gas analysis test operations previously required, are completely obviated.

A particularly important object of the invention is to provide apparatus as described above, which is utilizable under varying conditions and with the dissolved oxygen readings being accurate within reasonable tolerances, regardless of normal temperature variations in the liquid being measured and the rate of flow thereof relative to the test apparatus.

A still further important aim of the invention is to provide apparatus for measuring dissolved oxygen in water wherein the probe is made up of electrodes of thallium, lead and aluminum respectively, operably coupled to a current measuring device so that the amount of oxygen in a liquid in which the probe is immersed, may be readily determined by virtue of reaction of the thallium with the oxygen, thereby producing a measurable current between the electrodes. In this respect, another significant object of the invention is to provide apparatus as referred to above, wherein the aluminum electrode is connected to one terminal of the current measuring device, while the thallium and lead electrodes are connected in parallel relationship to the other terminal so that currents of opposite direction are produced between the electrodes to thereby provide compensation for temperature variations in the liquid being tested.

Another very important object of the invention is to provide apparatus employing an electrode probe of thallium, lead and aluminum electrodes operably coupled to a measuring device wherein an ion permeable membrane is provided around each of the electrodes to prevent variations in the flow rates of the liquid being tested affecting the readings of the current measuring device.

Another object of the invention is to provide apparatus capable of measuring the dissolved oxygen content in a flowing liquid which is particularly useful for determining the amount of oxygen in sewage within a sewage treatment facility so that the apparatus may be coupled through servo-mechanism or the like to structure for delivering controlled amounts of air or oxygen to the body of sewage in response to variations in the oxygen content sensed by the test apparatus.

In the drawing:

FIG. 1 is an elevational view of portable test apparatus for measuring the amount of dissolved oxygen in a liquid and constructed in accordance with the preferred concepts of the present invention, with the probe and container thereof being shown to one side of the instrument case for clarity of illustration;

FIG. 2 is a plan view of the apparatus illustrated in FIG. 1 and showing the probe and container therefor in normal disposition on the rear face of the instrument case;

FIG. 3 is a schematic representation of the probe and operating circuit therefor provided within the test instrument case; and FIG. 4 is a greatly enlarged horizontal cross-sectional view taken substantially on line 4—4 of FIG. 1.

Apparatus capable of measuring dissolved oxygen in water, in accordance with the present invention, is broadly designated 10 in the drawing, and includes a generally rectangular instrument case 12 mounting a visually observable microammeter 14 on the front face panel 16 thereof so that the operator may readily observe the location of needle 18 with reference to the linear scale 20. The front face panel 16 of case 12 also mounts a double pole double throw toggle switch 22, a selectively adjustable potentiometer control 24, and a pair of terminals 26 and 28 identified with appropriate positive and negative indicia on panel 16.

A generally U-shaped clip 30 secured to the rear surface 32 of case 12 and projecting outwardly therefrom, is adapted to removably receive a general cylindrical, open top container 34 of transparent, synthetic resin material and adapted to receive a quantity of liquid 36 therein, such as water. The upper opening defining extremity of container 34 is internally threaded to complementally receive the external threads of a mounting block 38 which serves as means for mounting elongated, generally cylindrical electrodes 40, 42 and 44 respectively.

Electrode 40 is preferably of lead, electrode 42 of aluminum and electrode 44 of thallium.

The upper extremities of the electrodes, as illustrated in FIG. 3, are embedded in block 38 in disposition with the longitudinal axes thereof being in generally parallel relationship with the outer surfaces of the same in equidistant relationship and thereby located at the apices of an imaginary equilateral triangle. The electrodes are also of substantially equal length, as is apparent from FIGS. 1 and 3. A membrane 46 of an ion permeable material is provided around each of the electrodes 40, 42 and 44 in completely encasing relationship thereto with the membrane preferably being of cellulose acetate or cellulose nitrate. In any event, the membrane should be of properties and thickness permitting inorganic ions to pass therethrough but precluding passage of organic molecules and other particles of similar size or larger therethrough.

The thallium electrode 44 is connected to the switch arm 48 of selector switch 22 by line 50 while the coil 52 of potentiometer 54 is interposed in a line 56 leading from lead electrode 40 to line 50. Line 58 serves to join aluminum electrode 42 directly to line 56. The movable contact 60 of potentiometer 54 is coupled to the positive terminal 62 of microammeter 14 by line 64 while the negative terminal 66 of microammeter 14 is joined to switch arm 68 of selector switch 22 by line 70.

A load resistor 72 is provided in line 74 between contacts 76 and 78 of switch 22 while line 80 connects terminal 26 to contact 82 of switch 22 and line 84 couples contact 86 of switch 22 to terminal 28. As noted schematically in FIG. 3, switch arms 48 and 68 are suitably ganged.

The conductor lines 56 and 50 extending from case 12 to mounting block 38, are suitably encased in an insulating sheath 88 which is of sufficient length to be immersed in a liquid at a substantial distance from case 12. Thus, suitable brackets 90 are provided on surface 32 of case 12 in outwardly extending relationship therefrom, serving as means for storing sheath 88 and the conductors therein when wound around the brackets, as illustrated in FIG. 2. Handle 92 on the top of case 12 facilitates manual transportation of apparatus 10.

In operation, the container 34 is removed from mounting block 38 and the probe, defined by electrodes 40, 42 and 44 is immersed in the liquid to be tested for dissolved oxygen content. The toggle switch 22 is placed in disposition normally designated as "Indicate" whereby the switch arms 48 and 68 will be in the disposition thereof illustrated in FIG. 3, placing the load resistor 72 in circuit with the ammeter 14. If the liquid to be measured comprises a flowing stream, it is only necessary that the probe be held in the liquid so that a direct reading may be observed on the dial of meter 14. However, if the water is still, since some water movement or flow is required for accurate determination of the amount of oxygen in the liquid, the probe should be moved back and forth while reading the disposition of needle 18 with respect to the indicia of scale 20.

It has been determined that the liquid containing dissolved oxygen must have approximately four hundred parts per million of dissolved solids in the liquid in order to give a correct reading on meter 14. Dissolved solids in the context used herein means primarily those materials which will ionize and thus includes inorganic salts although certain types of organic materials would also fall into this catergory. However, if the liquid to be tested does in fact have four hundred parts per million or more of dissolved solids therein, it has been determined that the reading of needle 18 on scale 20 gives a direct indication of the amount of oxygen in the liquid being tested. Empirical studies have shown that the amount of current measured by meter 14 is linearly related to the amount of oxygen in the liquid.

Since apparatus 10 is especially useful for measuring dissolved oxygen in water that contains at least four hundred parts per million of dissolved solids, it has been determined that the most important utility of the present structure is concerned with measurement of the amount of oxygen in sewage within the digestion basin of a sewage treatment facility. It is well known that the amount of oxygen present in the digestion basin of a sewage treatment plant is an extremely important parameter that must be maintained at a predetermined value or above in order to obtain most efficient treatment of the raw sewage. For this reason, it is desirable to have an accurate method available of determining the amount of oxygen in the sewage in the digestion basin and with such information preferably being continuously available so that adjustment may be made in the amount of air delivered to the digestion basin in accordance with the oxygen level in the sewage. Thus, apparatus 10 is usable to permit either periodic or continuous determination of the amount of dissolved oxygen in the digestion basin of a sewage tank with it being possible to control air supply mechanism directly from the testing apparatus through suitable current sensitive devices and control units which are conventional in the electronic control field.

Apparatus 10 also is useful for measuring dissolved oxygen in sea water which is important in oceanographic studies related to presence and number of fishes, fish migration studies and similar purposes. Apparatus 10 also has utility for measuring dissolved oxygen in all types of saline water and any natural water streams having the four hundred parts per million dissolved solids therein. With respect to saline water, the test apparatus is particularly useful for measuring the amount of dissolved oxygen in the brine present in oil wells, to permit correction of those conditions which can cause corrosion when excess amounts of oxygen are present in the brine subjected to high heat from the drill bit.

The exact operation of apparatus 10 in measuring the amount of dissolved oxygen in a liquid is not fully understood, but it is known that the thallium electrode 44 reacts with oxygen in the liquid to produce thallous hydroxide thereby resulting in a release of electrons which flow through the conductive liquid to the lead electrode 40 thereby producing a current which is quantitatively measured by meter 14. Since the amount of oxygen reacting with the thallium electrode 44 is relatively small per unit of time, it is to be understood that even though the electrode is used up over a period of time, it does have a relatively long, useful life requiring only infrequent replacement.

Electrodes 40, 42 and 44 are chosen because of their relative positions in the electromotive force series with lead having an electrode potential of $-0.80$ while thallium has an electrode potential of $+0.330$. The electrode potential of aluminum is $+1.70$. It is therefore, apparent that the total potential difference between the thallium and lead electrodes is 1.13 while the potential difference between the aluminum electrode and thallium is 1.37. However, the flow of electrons will be in opposite directions from the thallium to the lead than from the aluminum to the thallium so that currents in opposite directions are created in the cell produced when the probe defined by electrodes 40, 42 and 44 is immersed in a liquid containing oxygen and dissolved solids therein. Meter 14 thereby reads an effective current since the two currents actually produced between the electrodes but in opposite directions result in a cancellation of the smallest current and a corresponding reduction in the intensity of the other current.

The utilization of aluminum electrode 42 which produces a bucking current to that introduced between electrodes 40 and 44, has been found to provide compensation for temperature differentials encountered during dissolved oxygen measurements so that within practical limits, an accurate reading can be obtained on the scale 20 of meter 14 without regard to the temperature of the solution being tested. Thus, direct readings are obtained without compensating formulas being needed or complicated components within apparatus 10 for automatically providing temperature compensation. It is recognized that the degree of ionization in a liquid containing ionizable materials, is dependent upon the temperature of the solution as well as the concentration of the ionizable materials therein. Thus, upon increase in temperature of the solution a higher degree of ionization is obtained, thereby affecting the amount of current that may flow through the solution, thus altering the reading which would be obtained on meter 14 if only lead and thallium electrodes were employed for the probe. Since the specific resistance of a solution varies with the degree of ionization of the electrolyte therein, variation of the degree of ionization of the materials in the solution between the electrodes will also cause a variation on the reading of the meter as the specific resistance changes with temperature differentials. For this reason, upon increase in temperature of the solution under test, even though the dissolved oxygen content would remain the same in the solution, the meter reading would change because of lowering of the specific resistance of the solution. By the same token, lowering of the temperature of the test solution would have the opposite effect and the meter reading would be less even though the dissolved oxygen content remained constant.

It is believed that the addition of the aluminum electrode 42 in parallel relationship with lead electrode 40 with respect to meter 14, provides a bucking current to the current between the thallium and the lead which is the primary circuit of the measuring device and which tends to cancel out variations that occur because of temperature differences when different readings are taken. For example, if the temperature of the solution under test increases, thereby tending to cause the meter reading to change because of decrease in the specific resistance of the solution, a greater amount of electrons are also caused to flow in an opposite direction between the aluminum and thallium electrodes and effectively cancelling out the increase of electron flow between the thallium and the lead. It appears that the cancellation current is sufficiently linear with respect to the primary current between the thallium and the lead, to prevent distortion of the meter readings by variations in temperature of the solution under test.

As above noted, it is necessary that the liquid under test be flowing past the electrodes of the probe during the test so that oxygen in the solution is always available to react with the thallium in order to give an accurate indication on scale 20. Thus, if the liquid is not flowing, the same result can be obtained by moving the probe back and forth while observing the reading on scale 20.

The protective membrane 46 around each of the electrodes 40, 42 and 44, is also important since cellulose acetate and cellulose nitrate of the thickness employed are permeable only to inorganic ions, thereby resulting in exclusion of organic materials from the surface of the electrodes which would form corrosive and undesirable deposits thereon affecting the accuracy of the test instrument. Furthermore, with respect to the thallium electrode, the membrane also prevents wear corrosion which could occur because of the flow of liquid past the probe while the latter is immersed in the liquid. Since thallium is a relatively soft metal, impingement of liquid thereagainst could cause the electrode to rapidly wear away and require frequent replacement thereof, but more importantly, would render the readings on meter 14 inaccurate.

The voltage divider 54 permits calibration of the test apparatus 10 for accurate readings within the tolerances of the components used with the instrument preferably being precalibrated before shipping and normally not requiring any field calibration during use. When it is desired that the apparatus 10 be used for continuous testing procedures, it is normally desirable that the same be connected to a recorder of any suitable type with the leads of the recorder being connected to the terminals 26 and 28 respectively in conjunction with shifting of the operating arm of switch 22 into the "Record" location with the switch arms 48 and 68 in engagement with the contacts 82 and 86 respectively.

Having thus described the invention what is claimed as new and desired to be secured by Letters Patent is:

1. Apparatus for measuring the amount of dissolved oxygen in an electrically conductive liquid containing a major proportion of water, said apparatus comprising:
    three elongated electrodes of thallium, lead and aluminum respectively, and adapted to be immersed in said liquid;
    an ammeter having a pair of terminals;
    first conductor means connecting the thallium electrode to one of the terminals; and
    second conductor means connecting the aluminum and lead electrodes in parallel relationship to the other of said terminals.

2. Apparatus as set forth in claim 1, wherein said electrodes are mounted on a common support therefor and located in equidistantly spaced, generally parallel relationship.

3. Apparatus as set forth in claim 2, wherein is provided open top, liquid receiving container means adapted to removably receive the electrodes therein and in disposition with the support resting on and supported by the container means.

4. Apparatus for measuring the amount of oxygen in an electrically conductive liquid containing a major proportion of water, said apparatus comprising:
    first, second and third electrodes adapted to be immersed in said liquid, said second electrode having a position in the electromotive series between the respective positions of said first and third electrodes and being of a material characterized by its tendency to vary in electromotive potential in response to a variance in the oxygen content of said liquid, there being electrical means consisting of a conductor directly interconnecting and serving as the sole conductive path between said first and third electrodes; and
    electrically actuated current measuring mechanism coupled electrically in series with and between said second electrode and said electrical means to measure the algebraic sum of the oppositely directed galvanic currents generated between said first and second electrodes and said second and third electrodes during reaction of said second electrode with oxygen and thereby the quantity of oxygen in said liquid.

5. Apparatus for measuring the amount of dissolved oxygen in an electrically conductive liquid containing a major proportion of water, said apparatus comprising:
    three electrodes adapted to be immersed in said liquid, one of said electrodes being reactive with dissolved oxygen in the liquid and having a position in the electromotive series between the respective positions of the remaining electrodes;
    electrical means consisting of a conductor directly interconnecting and serving as the sole conductive path between said remaining electrodes; and
    means electrically connected in series with and between said electrical means and said one electrode for measuring the galvanic current therebetween generated during reaction of oxygen with said one electrode whereby the amount of current measured is a function of the dissolved oxygen content of the liquid and whereby the current between one of said remaining electrodes and said one electrode opposes and at least partially cancels the current between said one electrode and the other of said remaining electrodes to thereby provide compensation for temperature variations of the liquid.

6. Apparatus as set forth in claim 5, wherein said one electrode is of thallium.

7. Apparatus as set forth in claim 5, wherein said one of said remaining electrodes is of lead.

8. Apparatus as set forth in claim 5, wherein said other of said remaining electrodes is of aluminum.

9. Apparatus as set forth in claim 5, wherein said electrodes are located in equidistant relationship at the apices of an imaginary triangle defined thereby.

References Cited by the Examiner

UNITED STATES PATENTS

| | | | |
|---|---|---|---|
| 2,288,180 | 6/1942 | Brengman et al. | 204—195 |
| 2,510,262 | 6/1950 | Sollner et al. | 204—195 |
| 2,805,191 | 9/1957 | Hersch | 204—1 |
| 2,912,367 | 11/1959 | Asendorf et al. | 204—195 |

(Other references on following page)

UNITED STATES PATENTS

| | | |
|---|---|---|
| 2,927,888 | 3/1960 | Beard 204—195 |
| 3,000,805 | 9/1961 | Carnitt et al. 204—195 |
| 3,022,241 | 2/1962 | Jessop 204—195 |
| 3,080,444 | 3/1963 | Cohn et al. 204—195 |
| 3,124,520 | 3/1964 | Juda. |
| 3,196,100 | 7/1965 | Digby 204—195 |
| 3,218,242 | 11/1965 | Capuano 204—195 |
| 3,246,235 | 4/1966 | Allsopp 204—195 |
| 3,250,689 | 5/1966 | Seyl 204—195 |

OTHER REFERENCES

Le Baron et al.: "Trans. of the Electrochemical Soc.," volume LXXVII, 1940, pages 289–297.

JOHN H. MACK, *Primary Examiner.*

T. H. TUNG, *Assistant Examiner.*